United States Patent
Harris et al.

(10) Patent No.: US 11,800,339 B2
(45) Date of Patent: Oct. 24, 2023

(54) COMMUNICATION SYSTEM AND METHODS PROVIDING PUSH-TO-TALK (PTT) OPERATION WITH ENHANCED BLUETOOTH LOW ENERGY (BLE) SECURITY

(71) Applicant: HARRIS GLOBAL COMMUNICATIONS, INC., Albany, NY (US)

(72) Inventors: Daniel J. Harris, Rochester, NY (US); Cory N. Fitzsimmons, Avon, NY (US)

(73) Assignee: HARRIS GLOBAL COMMUNICATIONS, INC., Albany, NY (US)

( * ) Notice: Subject to any disclaimer, the term of this patent is extended or adjusted under 35 U.S.C. 154(b) by 0 days.

(21) Appl. No.: 17/446,871

(22) Filed: Sep. 3, 2021

(65) Prior Publication Data
US 2023/0075414 A1    Mar. 9, 2023

(51) Int. Cl.
*H04W 4/80* (2018.01)
*H04W 48/16* (2009.01)

(52) U.S. Cl.
CPC ............. *H04W 4/80* (2018.02); *H04W 48/16* (2013.01)

(58) Field of Classification Search
CPC ...................................................... H04W 4/80
See application file for complete search history.

(56) References Cited

U.S. PATENT DOCUMENTS

| | | | |
|---|---|---|---|
| 9,424,417 B2 | 8/2016 | Brown et al. | |
| 9,445,305 B2 | 9/2016 | Lyon et al. | |
| 9,603,013 B2 | 3/2017 | Niewczas et al. | |
| 2004/0030894 A1* | 2/2004 | Labrou | G06Q 20/02 713/168 |
| 2008/0310325 A1* | 12/2008 | Yang | H04W 84/18 370/254 |
| 2014/0099905 A1* | 4/2014 | Jimenez | H04B 1/3833 455/90.2 |

(Continued)

FOREIGN PATENT DOCUMENTS

EP    3232694    10/2017

OTHER PUBLICATIONS

Corbellini et al. "Two-Way Communication Protocol using Bluetooth Low Energy Advertisement Frames" Published in SmartObjects '15 2015: Computer Science; pp. 6.

(Continued)

*Primary Examiner* — Wen W Huang
(74) *Attorney, Agent, or Firm* — ALLEN, DYER, DOPPELT, + GILCHRIST, P.A.

(57) ABSTRACT

A communication system may include a first radio frequency (RF) device configured to generate a Bluetooth Low Energy (BLE) advertisement responsive to an input event, transmit the BLE advertisement in a BLE advertisement burst comprising a number of transmissions in at least one BLE advertising channel, and discontinue transmission of the BLE advertisement after transmission of the BLE advertisement burst. The system may further include a second RF device configured to scan for the BLE advertisement in the at least one BLE advertising channel, and communicate with the first RF device over a BLE data channel responsive to receiving the BLE advertisement.

21 Claims, 4 Drawing Sheets

(56) References Cited

U.S. PATENT DOCUMENTS

| | | | |
|---|---|---|---|
| 2015/0065047 A1* | 3/2015 | Wu | H04W 4/80 455/41.2 |
| 2015/0215781 A1* | 7/2015 | Reed | H04W 4/80 726/5 |
| 2017/0013450 A1* | 1/2017 | Ziv | H04W 12/03 |
| 2017/0094587 A1* | 3/2017 | Ding | H04L 69/18 |
| 2017/0180916 A1* | 6/2017 | Jakusovszky | G06Q 30/0267 |
| 2018/0249517 A1* | 8/2018 | Park | H04W 76/11 |
| 2019/0116046 A1* | 4/2019 | Hoyer | H04L 9/0643 |

OTHER PUBLICATIONS

Stute et al., "Disrupting Continuity of Apple's Wireless Ecosystem Security: New Tracking, DoS, and MitM Attachs on iOS and macOS Through Bluetooth Low Energy, AWDL, and Wi-Fi", Secure Mobile Networking Lab, Technical University of Darmstadt, Germany, downloaded by EPO Jul. 2021, pp. 1-18.

* cited by examiner

COMMUNICATION SYSTEM AND METHODS PROVIDING PUSH-TO-TALK (PTT) OPERATION WITH ENHANCED BLUETOOTH LOW ENERGY (BLE) SECURITY

TECHNICAL FIELD

The present application relates to radio frequency (RF) communications devices, and more particularly to wireless personal area network devices and related methods.

BACKGROUND

Bluetooth Low Energy (BLE) is a wireless personal area network (WPAN) technology used for many different small devices. For example, BLE is used for biometric monitoring (heart rate/blast sensing), sensors (e.g., trip sensors/monitors, etc.), as well as push-to-talk (PTT) devices for use with radios (e.g., VHF radios) for first responders, etc.

BLE devices constantly advertise their presence so other devices can connect to them. That is, these devices can have pairing modes, but despite whether they are pairing or not they are always advertising. BLE advertisements typically include a media access control (MAC) address and a text identifier.

One example BLE device is the CT-WirelessPTT MIL from CeoTronics AG, Germany. This is a wireless PTT button that is available in different radio standards for use with multifunctional receiver systems. In addition, it can be used to control apps or Bluetooth-enabled devices, such as smartphones.

Despite the existence of such systems, further advancements in BLE devices may be desirable in certain applications.

SUMMARY

A communication system may include a first radio frequency (RF) device configured to generate a Bluetooth Low Energy (BLE) advertisement responsive to an input event, transmit the BLE advertisement in a BLE advertisement burst comprising a number of transmissions in at least one BLE advertising channel, and discontinue transmission of the BLE advertisement after transmission of the BLE advertisement burst. The system may further include a second RF device configured to scan for the BLE advertisement in the BLE advertising channel(s), and communicate with the first RF device over a BLE data channel responsive to receiving the BLE advertisement.

By way of example, the advertisement burst may comprise less than or equal to five BLE advertisements. In accordance with one example implementation, the BLE advertisement may comprises a first BLE advertisement, and the first RF device may be further configured to generate a second BLE advertisement responsive to a second PTT event and having a different number of bytes in the advertisement packet than the first BLE advertisement. For example, the first and second BLE advertisements may comprise respective first and second initialization vectors (IVs), and the first and second IVs may have a different number of bytes.

In an example embodiment, the first and second RF devices may be configured to communicate and exchange a shared encryption key, and the BLE advertisement may comprise a payload encrypted with the shared encryption key. In some embodiments, the first and second RF devices may be configured to communicate and exchange a default IV, and the BLE advertisement may comprise a combination of a random IV and the default IV. In an example implementation, the first RF device may generate the BLE advertisement to include a pseudorandom Media Access Control (MAC) address.

In another example embodiment, the at least one advertising channel may comprise a plurality thereof, and the first RF device may be configured to perform channel hopping across the plurality of BLE advertising channels. In an example configuration, the first RF device may comprise a push-to-talk (PTT) switch for detecting a PTT input event. In some embodiments, the first RF device may also include a microphone, and the second RF device may comprise a very high frequency (VHF) transmitter for transmitting audio received by the microphone over a VHF channel.

Related RF devices, such as those discussed above, are also provided. Moreover, a related method for using an RF device such as those discussed above is also provided. The method may include generating a BLE advertisement responsive to an input event, transmitting the BLE advertisement in a BLE advertisement burst comprising a number of transmissions in at least one BLE advertising channel, discontinuing transmission of the BLE advertisement after transmission of the BLE advertisement burst, and communicating with another RF device over a BLE data channel responsive to the second RF device receiving the BLE advertisement.

A related non-transitory computer-readable medium may have computer-executable instructions for causing an RF device including a Bluetooth transceiver to perform steps including generating a BLE advertisement responsive to an input event, and transmitting the BLE advertisement in a BLE advertisement burst comprising a number of transmissions in at least one BLE advertising channel. The steps may further include discontinuing transmission of the BLE advertisement after transmission of the BLE advertisement burst, and communicating with another RF device over a BLE data channel responsive to the second RF device receiving the BLE advertisement.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As noted above, Bluetooth® Low Energy (BLE) is a commercial wireless personal area network (WPAN) protocol that is frequently used for small devices in applications such as biometric monitoring (heart rate/blast sensing), sensor (e.g., trip sensors/monitors, etc.), and push-to-talk (PTT) devices for use with radios (e.g., VHF radios) for first responders, etc. BLE is a mature and robust wireless protocol which provides for low cost, commercially available microcontroller units (MCUs) that may last several months (e.g., six months or more) on a battery charge. Yet, a drawback of BLE is that it has relatively few options for security, and even these options may not be properly implemented in many cases. BLE devices continuously transmit advertising beacons at regular intervals to allow discovery by an associated RF device. Yet, this also makes them more susceptible to discovery by other devices, as well as to direction finding. In some cases, BLE advertisements may even identify individual users. As will be discussed further below, the techniques described herein provide for enhanced BLE security by generating advertising packets which are formatted to help avoid discovery of sensitive information, and transmission of the advertisements in BLE advertisement bursts to help avoid unwanted discovery and direction finding.

Figure 1:
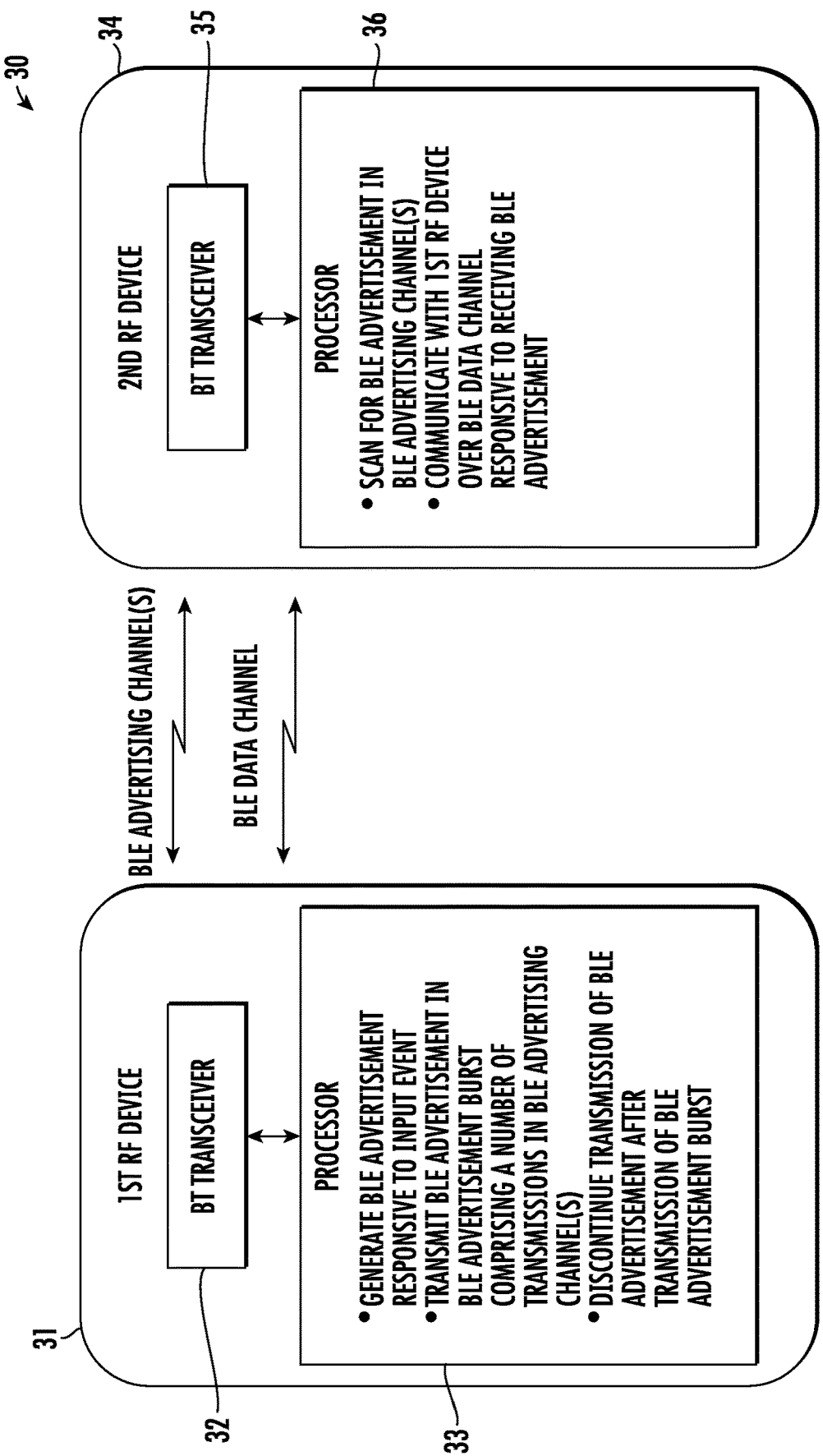
FIG. 1 is a schematic block diagram of a communication system in accordance with an example embodiment.
Figure 5:
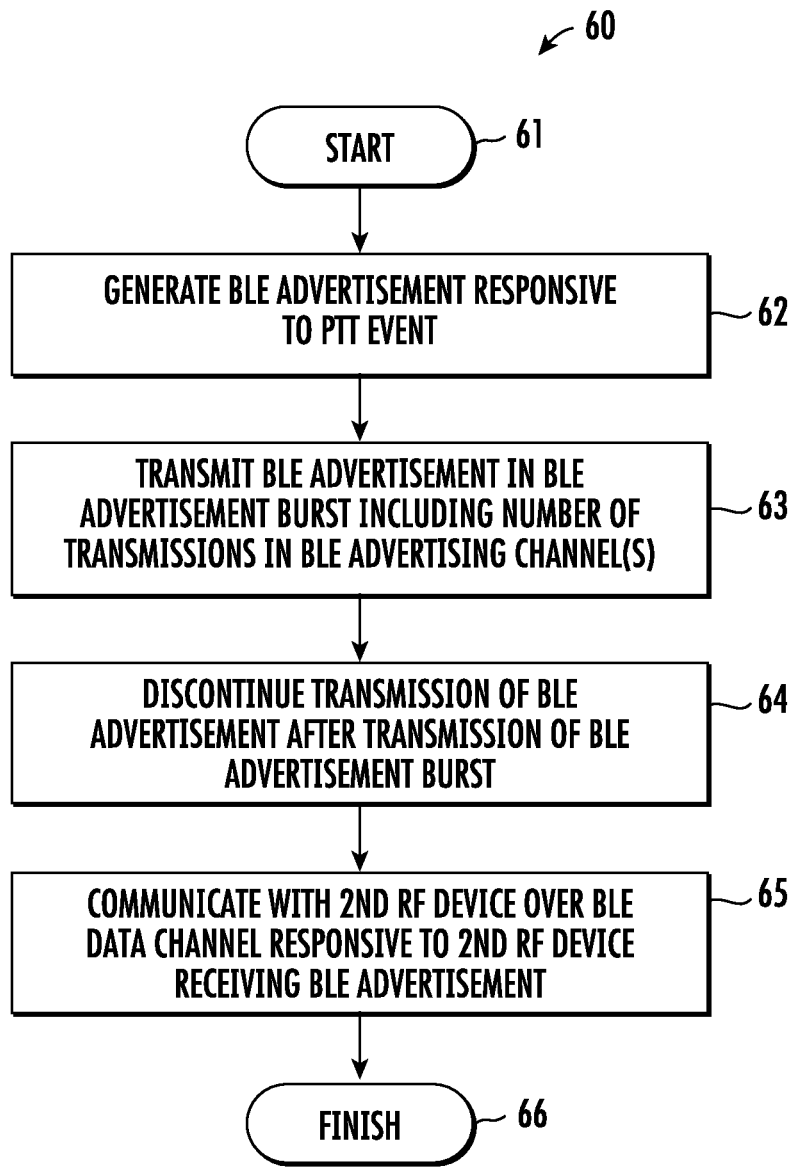
FIG. 5 is a flow diagram illustrating method aspects associated with the system of FIG. 1.

Turning now to FIG. 1 and the flow diagram 60 of FIG. 5, a communication system 30 illustratively includes a first radio frequency (RF) device 31 which illustratively includes a Bluetooth® transceiver 32 and a processor 33. By way of example, the processor 33 may be implemented using a microprocessor and associated non-transitory computer readable medium having computer-executable instructions for performing the operations described herein. Beginning at Block 61, the processor 33 is configured to cooperate with the transceiver 32 and generate a BLE advertisement responsive to an input event (e.g., a push-to-talk (PTT) event), at Block 62, and transmit the BLE advertisement in a BLE advertisement burst including a number of transmissions in one or more BLE advertising channels (Block 63), as will be discussed further below. Moreover, the first RF device 31 also discontinues transmission of the BLE advertisement after transmission of the BLE advertisement burst, at Block 64. The system 30 further illustratively includes a second RF device 34 including a Bluetooth® transceiver 35 and processor 36, which again may be implemented using a microprocessor and associated non-transitory computer readable medium having computer-executable instructions for performing the operations described herein. The processor 36 may be configured to cooperate with the transceiver 35 to scan for the BLE advertisement in the BLE advertising channel(s), and communicate with the first RF device 32 over a BLE data channel responsive to receiving the BLE advertisement, at Block 65. The method of FIG. 6 illustratively concludes at Block 66.

Figure 2:
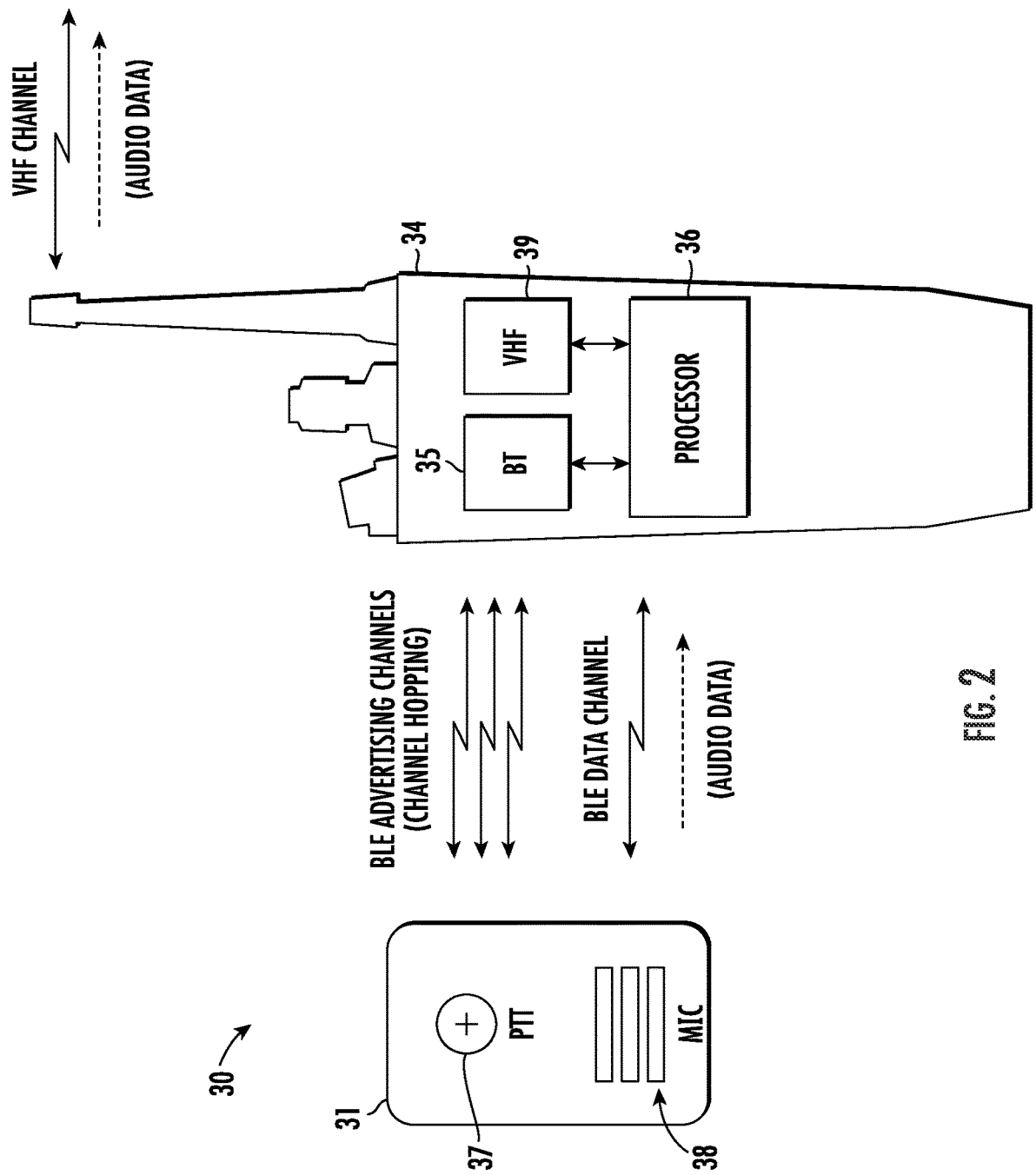
FIG. 2 is a schematic block diagram of an example implementation of the communication system of FIG. 1.

In an example configuration of the system 30 illustrated in FIG. 2, the first RF device includes a PTT switch 37 (here a button switch) and a microphone 38. For example, the first RF device 31 may be implemented in a relatively small form factor which is clipped to the front of a user's shirt or uniform to provide easy access for talking, or as part of a headset or earphones/earbuds, for example. Moreover, the second RF device 34 in this example is a handheld radio, which further illustratively includes a Very High Frequency (VHF) transceiver for transmitting audio received by the microphone 38 over a VHF channel (although other RF communication formats may be used in different embodiments). In the illustrated example, the first RF device 31 utilizes a plurality of advertising channels and channel hops the BLE advertisement burst across the plurality of BLE advertising channels, as will be appreciated by those skilled in the art, although transmission across a single advertisement channel may be used in some embodiments.

Figure 3:
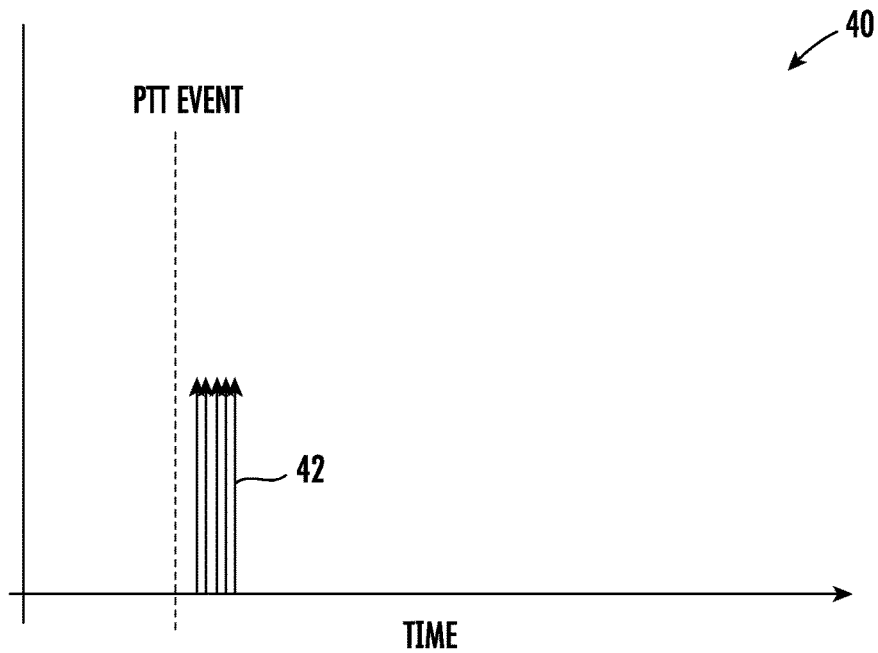
FIG. 3 is a graph of a Bluetooth Low Energy (BLE) advertisement burst which may be used by the first RF device of the system of FIG. 1 in an example embodiment.

Referring additionally to the graph 40 of FIG. 3, an example BLE advertisement scheme is now described. The first RF device 31 does not advertise until a PTT event requiring data transmission occurs. In the example of FIG. 2, the PTT event occurs when the button 37 is pressed, although in other implementations the input event could be a key press/release, sensor detection, etc. The second RF device 34 (host device) is continuously scanning for advertisements 42. When the PTT event occurs, a sequence of advertisements 42 is sent, after which the first RF device 31 ceases or discontinues transmitting on the advertising channel(s). Once the advertisement 42 is received by the second RF device 34, then the first RF device 31 and the second RF device cooperate to establish communications on a BLE data channel to transfer audio or other data (e.g., sensor data, etc.).

By way of example, the burst of advertisements 42 may include between two and five advertisements 42 (five are shown in the example of FIG. 3), although a single advertisement or more than five advertisements may be used in some embodiments. Generally speaking, the number of advertisements 42 in a burst should be selected to allow sufficient time for the second RF device 34 to receive the advertisement (a single advertisement could potentially be missed, for example) and increase the probability of reception, yet not so large as to give an eavesdropping device enough repetitions to perform direction finding or patterning operations, for example. It should be noted that a different number of advertisements may be included in different bursts in some embodiments.

Figure 4:
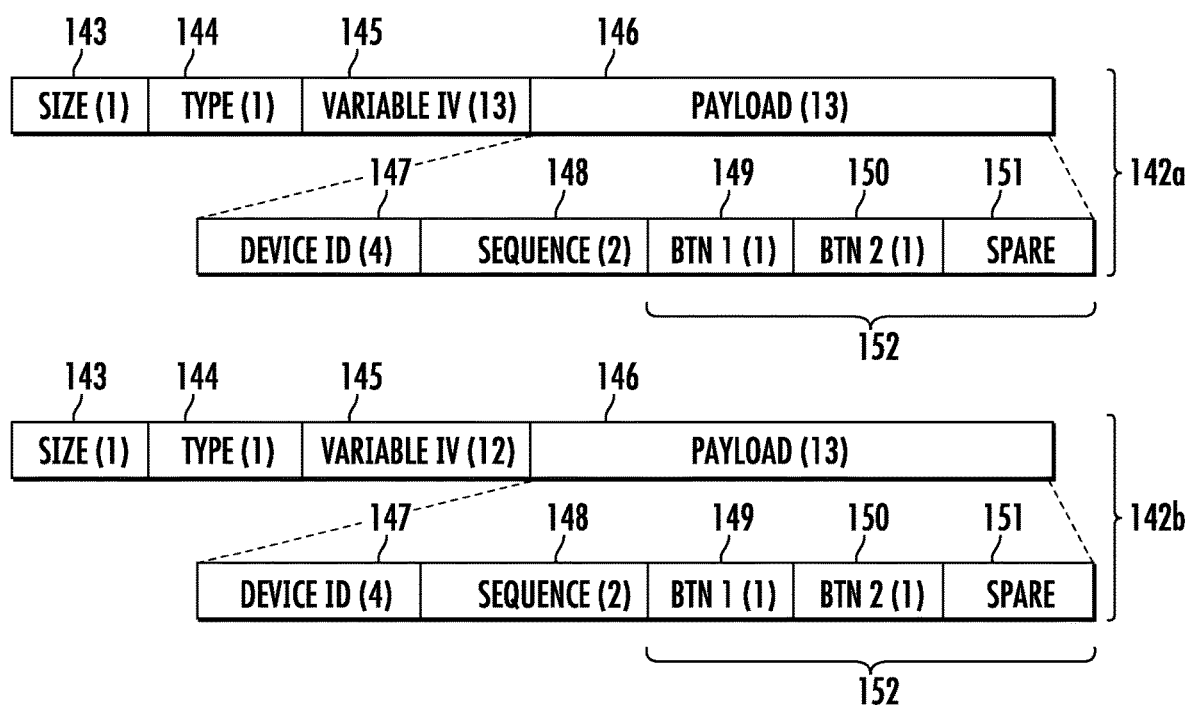
FIG. 4 is a schematic block diagram illustrating an example BLE advertising packet format which may be used by the first RF device of the system of FIG. 1 in example embodiments.

Referring additionally to FIG. 4, an example packet format for BLE advertisements is now described. In the illustrated example, there are two advertisements 142a, 142b which are sent in different bursts resulting from different PTT events at different times. Standard fields in a BLE GAP transmission include a size field 143, a data type field 144, and optionally a media access control (MAC) address (not shown). In accordance with the present embodiment, additional fields are provided for secure advertisement which illustratively include a randomized initialization vector (IV) 145, and an encrypted payload 146. The payload 146 illustratively includes a device ID 147, sequence field 148, buttons 1 and 2 (Btn1, Btn2) fields 149-150, and a spare data field 151.

The IV vector 145 is a variable-length cryptographic initialization vector, as will be discussed further below. The device ID 147 is a unique device identifier (four bytes in the illustrated example), and the sequence (here two bytes) is a packet sequence number for the detection of repeated transmissions. Device specific data 152 in the payload 146 illustratively includes the state of the first and second buttons (i.e., whether pressed or not) in the fields 149-150 (which are one byte each in this example), and additional space for other data is provided in the spare data field 151.

Various security measures may be implemented through the selection of the above-noted items. For example, the MAC address may be randomized so that it is not resolvable, if desired. In accordance with another security measure, the first and second RF devices 31, 34 may engage in an initial communication in which the first RF device is registered to the second RF device by providing the second RF device with the first RF device's ID and device type, and a shared encryption key is provided from the second RF device to the first RF device. The first RF device 31 may thereafter use the shared encryption key to encrypt the payload 146 in advertisements so that only the second RF device 34 is able to decrypt the device ID (or other information). As a result, the advertisements 142a, 142b may be free of readily identifiable information that is typical (e.g., name, services).

In an example embodiment, the advertisement packet format includes 31 bytes of available data, and one block of 16 bytes AES 256 encrypted data. Moreover, in the present example, the IVs 145 are of variable size, meaning that their size is changed from one advertisement to the next. In this case, the variable IV 145 in the advertisement 142a is thirteen bytes, while the variable IV in the second advertisement 142b is twelve bytes. The changing size of the variable IV 145 also changes the overall length of the advertisement. This helps to "disguise"the first RF device 31 so that its behavior is less observable, in that it is not continuously sending packets of the same size that are easier to pattern. The variable IVs 145 may be randomly generated by the first device 31 for different PTT events. The second RF device 34 performs authentication detection through the correct decoding of the device identifier 147.

Referring again to FIG. 1, an example device pairing flow is now described. The second (host) RF device 34 and the first RF device 31 are placed in a pairing mode, and the second RF device reads the device ID and device type (as discussed above) from the first RF device. The second RF device 34 checks device type compatibility, and if compatible generates a new random shared IV which it sends to the first RF device 31 along with a new random shared secret key. The first RF device 31 then enters a normal operational mode.

In an example data transmit flow, when a transmit event occurs (e.g., a PTT event), the first RF device 31 gathers the sixteen byte user data to be transmitted, and determines a length of the variable-length IV to be used. New random values for the variable-length IV may then be generated and combined with the pre-shared (default) IV to create the final variable-length IV to be encrypted with the shared encryption key and communicated to the second RF device 34. The sixteen byte user data is also encrypted with the shared encryption key, the final thirty-one byte advertisement packet is constructed, and the final packet is transmitted N times on M different channels, which may vary from one burst to the next, as noted above.

In an example data receive flow, the second RF device 34 receives the advertisement packet from the first RF device 31 and checks to see if this packet only includes manufacturer's data. If not, it discards it, but otherwise it reads the length of the packet and determines the variable IV length. The pre-shared (default) IV and the received IV are combined into one sixteen byte IV, which is decrypted with the shared key. Furthermore, the sixteen bytes of received encrypted data are extracted from the packet as well, which are decrypted with the shared key. The Device ID is checked to confirm receipt from the correct device, and if there is a match then the sequence number is also checked to determine if this is a repeated packet. If it is not, then the received data packet is processed accordingly.

The above-described approach advantageously helps prevent identification of individual devices (and, therefore, user), as well as device type (e.g., PTT vs some other device). Moreover, it may also help protect data and be more difficult to spoof vs. traditional schemes where time-based rolling keys/identifiers are used. Since the first RF device 31 does not continuously broadcast on a periodic schedule, this makes detection less likely than constant advertisements, and helps inhibit passive location determination. Moreover, this also helps enable low power states as the device does not need to be woken up to transmit periodically when not in use. Furthermore, multiple, closely spaced transmissions on all advertising frequencies allows receivers to more easily detect events. By way of example, a spacing of between 60 and 100 milliseconds may be used between advertisements, for example, although other spacings may be used in different embodiments. Furthermore, a relatively large number of registered or paired devices may be used with this approach, as connections do not need to be maintained, only pairing information and processing power to decode N times.

A related non-transitory computer-readable medium is also provided which may have computer-executable instructions for causing an RF device 31 including a Bluetooth® transceiver 32 to perform steps including generating a BLE advertisement responsive to a PTT event, and transmitting the BLE advertisement in a BLE advertisement burst comprising a number of transmissions in at least one BLE advertising channel, as discussed further above. The steps may further include discontinuing transmission of the BLE advertisement after transmission of the BLE advertisement burst, and communicating with another RF device 34 over a BLE data channel responsive to the other RF device receiving the BLE advertisement, as also discussed above.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. A communication system comprising:
a first radio frequency (RF) device configured to
  generate a Bluetooth Low Energy (BLE) advertisement responsive to an input event, the BLE advertisement comprising a payload encrypted with a shared encryption key and an initialization vector (IV) of a changeable length,
  transmit the BLE advertisement in a BLE advertisement burst comprising a number of transmissions in at least one BLE advertising channel, and
  discontinue transmission of the BLE advertisement after transmission of the BLE advertisement burst; and
a second RF device configured to
  scan for the BLE advertisement in the at least one BLE advertising channel, and
  communicate with the first RF device over a BLE data channel responsive to receiving the BLE advertisement.

2. The system of claim 1 wherein the BLE advertisement burst comprises less than or equal to five BLE advertisements.

3. The system of claim 1 wherein the BLE advertisement comprises a first BLE advertisement; and wherein the first RF device is further configured to generate a second BLE advertisement responsive to a second input event and having a different number of bytes than the first BLE advertisement.

4. The system of claim 3 wherein the first and second BLE advertisements comprise respective first and second IVs of changeable lengths, and wherein the first and second IVs have different lengths from one another.

5. The system of claim 1 wherein the first and second RF devices are configured to communicate and exchange a default initialization vector IV; and wherein the BLE advertisement comprises a combination of the IV of changeable length and the default IV.

6. The system of claim 1 wherein the first RF device generates the BLE advertisement to include a pseudorandom Media Access Control (MAC) address.

7. The system of claim 1 wherein the at least one advertising channel comprises a plurality thereof, and wherein the first RF device is configured to perform channel hopping across the plurality of BLE advertising channels.

8. The system of claim 1 wherein the first RF device comprises a push-to-talk (PTT) switch for detecting a PTT input event.

9. The system of claim 8 wherein the first RF device further comprises a microphone; and wherein the second RF device comprises a Very High Frequency (VHF) transmitter for transmitting audio received by the microphone over a VHF channel.

10. A radio frequency (RF) device comprising:
a Bluetooth transceiver; and
a processor cooperating with the Bluetooth transceiver and configured to
generate a Bluetooth Low Energy (BLE) advertisement responsive to an input event, the BLE advertisement comprising a payload encrypted with a shared encryption key and an initialization vector (IV) of a changeable length,
transmit the BLE advertisement in a BLE advertisement burst comprising a number of transmissions in at least one BLE advertising channel,
discontinue transmission of the BLE advertisement after transmission of the BLE advertisement burst, and
communicate with another RF device over a BLE data channel responsive to the other RF device receiving the BLE advertisement.

11. The RF device of claim 10 wherein the BLE advertisement burst comprises less than or equal to five BLE advertisements.

12. The RF device of claim 10 wherein the BLE advertisement comprises a first BLE advertisement; and
wherein the processor is further configured to generate a second BLE advertisement responsive to a second input event and having a different number of bytes than the first BLE advertisement.

13. The RF device of claim 10 wherein the at least one advertising channel comprises a plurality thereof, and wherein the processor is configured to perform channel hopping across the plurality of BLE advertising channels.

14. The RF device of claim 10 further comprising a push-to-talk (PTT) switch for detecting a PTT input event.

15. A method for using a radio frequency (RF) device comprising:
generating a Bluetooth Low Energy (BLE) advertisement responsive to an input event, the BLE advertisement comprising a payload encrypted with a shared encryption key and an initialization vector (IV) of a changeable length;
transmitting the BLE advertisement in a BLE advertisement burst comprising a number of transmissions in at least one BLE advertising channel;
discontinuing transmission of the BLE advertisement after transmission of the BLE advertisement burst; and
communicating with another RF device over a BLE data channel responsive to the second RF device receiving the BLE advertisement.

16. The method of claim 15 wherein the BLE advertisement burst comprises less than or equal to five BLE advertisements.

17. The method of claim 15 wherein the BLE advertisement comprises a first BLE advertisement; and further comprising generating a second BLE advertisement responsive to a second PTT event and having a different number of bytes than the first BLE advertisement.

18. The method of claim 15 wherein the at least one advertising channel comprises a plurality thereof, and further comprising performing channel hopping across the plurality of BLE advertising channels.

19. A non-transitory computer-readable medium having computer-executable instructions for causing a radio frequency (RF) device to perform steps comprising:
generating a Bluetooth Low Energy (BLE) advertisement responsive to an input event, the BLE advertisement comprising a payload encrypted with a shared encryption key and an initialization vector (IV) of a changeable length;
transmitting the BLE advertisement in a BLE advertisement burst comprising a number of transmissions in at least one BLE advertising channel;
discontinuing transmission of the BLE advertisement after transmission of the BLE advertisement burst; and
communicating with another RF device over a BLE data channel responsive to the second RF device receiving the BLE advertisement.

20. The non-transitory computer-readable medium of claim 19 wherein the BLE advertisement burst comprises less than or equal to five BLE advertisements.

21. The non-transitory computer-readable medium of claim 19 wherein the BLE advertisement comprises a first BLE advertisement; and further having computer-executable instructions for causing the RF device to perform a step of generating a second BLE advertisement responsive to a second PTT event and having a different number of bytes than the first BLE advertisement.

* * * * *